(12) United States Patent
Hossick-Schott

(10) Patent No.: US 6,802,951 B2
(45) Date of Patent: Oct. 12, 2004

(54) METHODS OF ANODIZING VALVE METAL ANODES

(75) Inventor: Joachim Hossick-Schott, Minneapolis, MN (US)

(73) Assignee: Medtronic, Inc., Minneapolis, MN (US)

(*) Notice: Subject to any disclaimer, the term of this patent is extended or adjusted under 35 U.S.C. 154(b) by 194 days.

(21) Appl. No.: 10/058,437

(22) Filed: Jan. 28, 2002

(65) Prior Publication Data
US 2003/0141193 A1 Jul. 31, 2003

(51) Int. Cl.$^7$ ............................................. C25D 11/26
(52) U.S. Cl. ........................ 205/108; 205/148; 205/322
(58) Field of Search ................................. 205/106, 107, 205/108, 148, 322

(56) References Cited

U.S. PATENT DOCUMENTS

| | | | | |
|---|---|---|---|---|
| 3,943,041 A | * | 3/1976 | Jackson ...................... 205/152 |
| 4,517,059 A | * | 5/1985 | Loch et al. ................... 205/83 |
| 4,839,002 A | * | 6/1989 | Pernick et al. ................ 205/83 |
| 4,863,880 A | * | 9/1989 | Fujisada ...................... 205/157 |
| 5,716,511 A | | 2/1998 | Melody et al. ............. 205/324 |
| 5,720,866 A | | 2/1998 | Erokhine et al. ............. 205/83 |
| 5,837,121 A | | 11/1998 | Kinard et al. ................ 205/322 |
| 5,922,215 A | | 7/1999 | Pless et al. ..................... 216/6 |
| 6,006,133 A | | 12/1999 | Lessar et al. ................... 607/5 |
| 6,113,770 A | * | 9/2000 | Rasmussen ................. 205/108 |
| 6,162,345 A | | 12/2000 | Kinard et al. ................ 205/318 |
| 6,230,181 B1 | | 5/2001 | Mitchell et al. ............. 709/100 |
| 6,231,993 B1 | | 5/2001 | Stephenson et al. ...... 428/472.1 |
| 6,235,181 B1 | | 5/2001 | Kinard et al. ................ 205/148 |
| 6,261,434 B1 | * | 7/2001 | Melody et al. .............. 205/171 |
| 6,267,861 B1 | | 7/2001 | Kinard et al. ................ 205/171 |

FOREIGN PATENT DOCUMENTS

EP 0 563 671 A1 6/1993
GB 2140031 A 5/1983

* cited by examiner

Primary Examiner—Roy King
Assistant Examiner—William T. Leader
(74) Attorney, Agent, or Firm—Paul H. McDowall; Girma Wolde-Michael

(57) ABSTRACT

Methods for anodizing sintered valve metal anodes for use in wet electrolytic capacitors implemented in implantable medical devices (IMDs). The methods generally include immersing a pressed valve metal anode in an anodizing electrolyte and developing an anode-electrolyte system. Subsequently, subjecting the anode-electrolyte system to a potential that is ramped up to a target voltage in a pulsed fashion and delivering voltage potential pulses to the anode. The pulses are preferably decreased in pulse width as the potential increases. The pulse width of the applied pulses is preferably defined by means of a duty, such that the applied pulse duty cycle is substantially 100% initially and declines over the formation time as the formation voltage increases to the target potential to substantially 1.0% or less. The pulses are preferably applied for a hold time following achievement of the target formation potential, as the pulse current declines toward zero current flow.

23 Claims, 9 Drawing Sheets

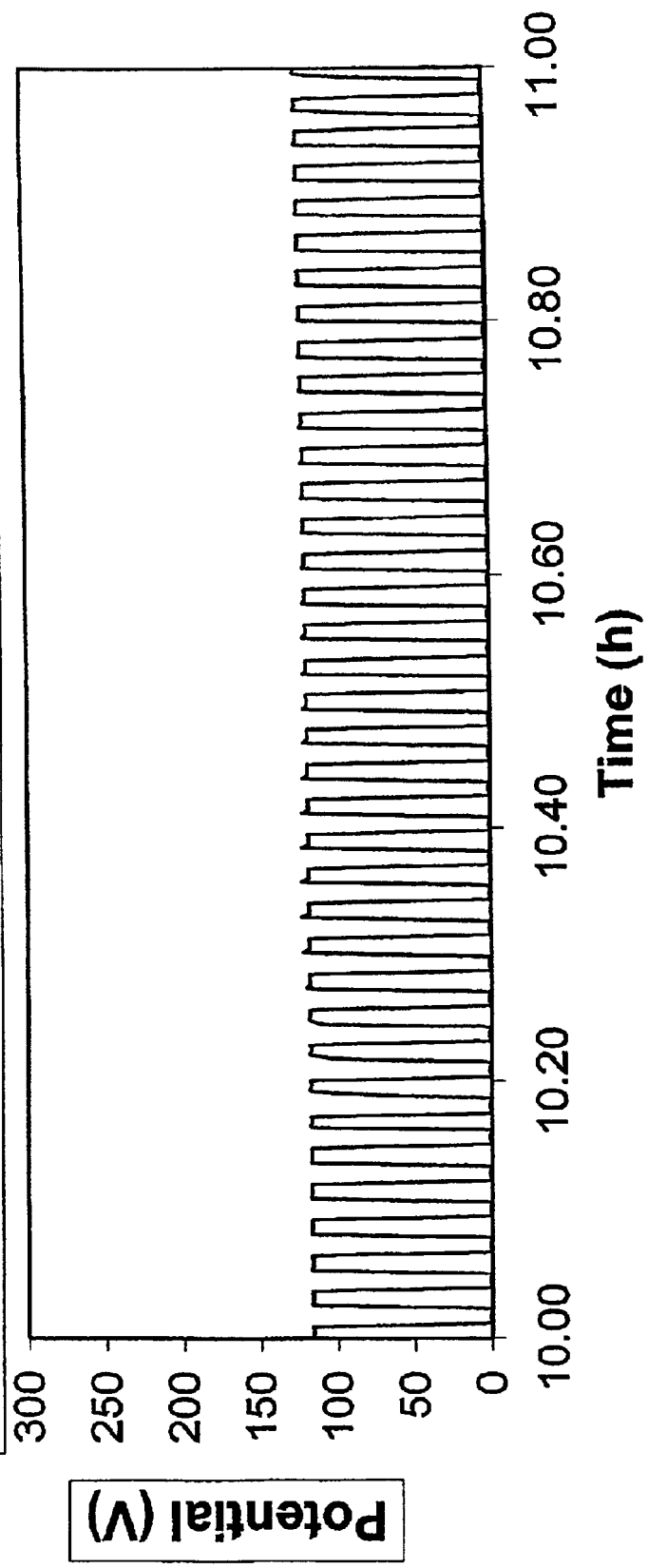

METHODS OF ANODIZING VALVE METAL ANODES

FIELD OF THE INVENTION

This invention relates to methods and process for anodizing sintered valve metal anodes for use in wet electrolytic capacitors. The methods are useful specifically for forming high voltage anodes of comparatively large volume. This type of anode may be chosen in high voltage capacitors incorporated into implantable medical devices (IMDs).

BACKGROUND OF THE INVENTION

The term "valve metal" stands for a group of metals including aluminium, tantalum, niobium, titanium, zirconium, etc., all of which form adherent, electrically insulating, metal-oxide films upon anodic polarization in electrically conductive solutions.

Wet electrolytic capacitors generally consist of an anode, a cathode, a barrier or separator layer for separating the anode and cathode and an electrolyte. In tubular electrolytic capacitors, anodes are typically composed of wound anodized aluminum foil in which subsequent windings are separated by at least one separator layer. The anodes in flat electrolytic capacitors may consist of stacked sheets of anodized aluminium or of tantalum sintered structures separated from the cathode by at least one separator layer as described further below. Such electrolytic capacitors find wide application in industry including in IMDs.

As described in commonly assigned U.S. Pat. No. 6,006,133, a wide variety of IMDs are known in the art. Of particular interest are implantable cardioverter-defibrillators (ICDs) that deliver relatively high-energy cardioversion and/or defibrillation shocks to a patient's heart when a malignant tachyarrhythmia, e.g., atrial or ventricular fibrillation, is detected. Electrical transformer circuitry charges one or more high voltage electrolytic capacitors to a high voltage a low voltage battery using a low voltage battery as a charge source, and the capacitor(s) are discharged into the patient's heart as a cardioversion/defibrillation shock. Current ICDs also typically possess single or dual chamber pacing capabilities for treating specified chronic or episodic atrial and/or ventricular bradycardia and tachycardia and were referred to previously as pacemaker/cardioverter/defibrillators (PCDs). Earlier automatic implantable defibrillators (AIDs) did not have cardioversion or pacing capabilities. For purposes of the present invention, ICDs are understood to encompass all such IMDs having at least high voltage cardioversion and/or defibrillation capabilities.

Energy, volume, thickness and mass are critical features in the design of ICD implantable pulse generators (IPGs) that are coupled to the ICD leads. The battery(s) and high voltage capacitor(s) used to provide and accumulate the energy required for the cardioversion/defibrillation shocks have historically been relatively bulky and expensive. Presently, ICD IPGs typically have a volume of about 40 to about 60 cc, a thickness of about 13 mm to about 16 mm and a mass of approximately 100 grams.

It is beneficial to patient comfort and minimizes complications due to erosion of tissue around the ICD IPG to reduce the volume, thickness and mass of such capacitors and ICD IPGs without reducing deliverable energy. Reductions in size of the capacitors may also allow for the balanced addition of volume to the battery, thereby increasing longevity of the ICD IPG, or balanced addition of new components, thereby adding functionality and additional features to the ICD IPG. It is also desirable to provide such ICD IPGs at low cost while retaining the highest level of performance. At the same time, reliability of the high-voltage capacitors cannot be compromised. Aluminium and Tantalum based electrolytic capacitors have usually been employed as high-voltage ICD capacitors. An aluminium electrolytic capacitor that is incorporated into an ICD IPG is disclosed in commonly assigned, co-pending U.S. patent application Ser. No. 09/607,830 filed Jun. 30, 2000, for IMPLANTABLE MEDICAL DEVICE HAVING FLAT ELECTROLYTIC CAPACITOR FORMED WITH PARTIALLY THROUGH-ETCHED AND THROUGH-HOLE PUNCTURED ANODE SHEETS filed in the names of Yan et al.

The performance of electrolytic capacitors is dependent upon several factors, e.g., the effective surface area of the anodes and cathodes that can be contacted by electrolyte, the dielectric constant of the oxide formed on the metal surface, the thickness of the oxide layer on top of the metal surface, the conductivity of the electrolyte etc. In all electrolytic capacitors, the thickness of the anodic oxide layer is approximately proportional to the potential applied to the anode during the formation of the anode, i.e., at the time when the anode is immersed into the formation electrolyte. For aluminum, the oxide grows approximately by 1.2 nm per Volt, for Tantalum this "rate" is somewhat higher, approximately 1.7 nm per Volt Niobium and tantalum anodes are typically made in the form of a ho pressed powder pellet or "slug" when used in an electrolytic capacitor. The density of the anode slugs is typically significantly less than the density of the metals themselves, i.e., up to ⅔ of the volume of a given slug may be open or pore space. The final density of the anode slug is largely determined at the time of pressing, when a known amount of powder is pressed into a known volume. For the proper formation of the anode slug it is critical to achieve a fairly homogeneous distribution of pores throughout the anode slug since the forming electrolyte needs to wet even the most "remote" cavities in the karst-like internal structure of the anode. This is specifically important for comparatively large anodes with volumes of the order 1 $cm^3$ or above. Furthermore, it is critical that electrolyte may flow fairly readily through the structure because a significant amount of electrical power may be dissipated as heat during the formation process. During formation, local potential differences of several hundred volts together with local current densities of several tens of milliamperes may be encountered, i.e., electrical energy as high a 20 to 30 Watts may be dissipated as heat. Various methods are used to achieve a homogeneous distribution of pores throughout the anode, as is well known to those skilled in the art. Traditional methods of forming the oxide layers are described in the prior art, e.g., in U.S. Pat. Nos. 6,231,993, 5,837,121, 6,267,861 and in the patents and articles referenced therein. Typically, a power source capable of delivering a constant current and/or a constant potential is connected to the anode slug that is immersed in the electrolyte. The potential is then ramped up to a desired final potential while a constant current flows through the anode-electrolyte system.

Regardless of the process by which the valve metal powder was processed, pressed and sintered valve metal powder structures, and specifically Tantalum and Niobium pellets, are typically anodized by the controlled application of formation potential and current while the anode is immersed in formation electrolytes. A typical formation electrolyte consists of ethylene glycol or polyethylene glycol, de-ionized water and $H_3PO_4$ and has a conductivity anywhere between 50 µS/cm (read: micro-Siemens per cm) to about 20,000 µS/cm at 40° C.

Conventional practice has been to form the anodically polarized valve metal to a target formation potential with a constant current flowing through the anode-electrolyte system. Typically, stainless steel cathodes are used with the glycol-containing electrolytes. The magnitude of the current depends on the electrolyte, the valve metal powder type and the size of the valve metal structure. Most of the electronic current flowing through the anode-electrolyte system is used in the process of the anodic oxidation for the electrolysis of water as outlined below:

Anodic process:

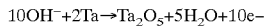

Cathodic process:

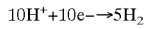

Therefore, the current setting directly influences the speed of the anodization reaction: using Faraday's laws, it can be readily shown that very low formation currents—for sintered Ta samples, low currents would mean currents of the order of 0.1 µA/µC or approximately 1 µA/cm$^2$—will require long formation times well in excess of 1 week for anode sizes and target formation potentials relevant for ICD capacitors. Adjusting these parameters according to conventional practice is within the knowledge of those skilled in the art. An anode is said to be fully formed when the layer of tantalum pentoxide has reached a certain thickness and structure which enables the anode to hold the electrical charge at the desired operating potential for an appropriate time duration and without an excessive amount of charge leaking out. The amount of charge leaking out per time unit is called the leakage current of the capacitor. A typical formation process may take anywhere between 1 and 250 h, depending upon such factors as the size and porosity of the anode structure and the electrolyte viscosity, temperature and conductivity.

The above-referenced '121 patent discloses use of particular electrolytes and applied potentials and currents that depart from the normal practice of applying a constant potential and current as described in the above-referenced '993 patent. The electrolyte in the '121 patent comprises glycerine solutions of dibasic potassium phosphate which have been heated to 180° C. for 1–2 hours, or to 150° C. overnight. It is reported that such thermally treated electrolytes behave far differently when employed as anodizing electrolytes at 150° C. or above compared to electrolytes that are not thermally treated. It is alleged that the thermally treated electrolytic solutions provide anodic films on tantalum and other valve metals which are not limited in thickness according to the anodizing voltage, but instead continue to grow thicker so long as anodising potential is applied.

It is suggested in the '121 patent that relatively uniform thick films can be produced within the interstices and on the surface of sintered tantalum powder capacitor anodes if the potential applied to the anode bodies is applied as pulsed direct current (DC). The positive bias pulse is continued for approximately 0.3 seconds or less with an unbiased or open-circuit period of at least 0.3 seconds between pulses. It is also suggested that alternating current (AC), half-wave AC, saw-tooth waveforms, etc., can also be used in place of pulsed DC to obtain uniform anodic films in these electrolytes. However, no other details are provided. Clearly, the goal of applying pulsed potentials in the '121 patent is to support the growth of oxide the thickness of which is not limited by the formation potential.

The above-referenced '993 patent reports that there are problems with conventional valve metal anodization processing due to heating of the electrolyte inside the interstitial pores of the porous tantalum pellet during the anodization process. The heating of the electrolyte is due to the thermal dissipation of electrical power within the anode the structure. The dissipation of power may be non-isotropic, that is, locally, some areas within in the anode may become very hot while others may remain comparatively cool. In the hot areas of the karst-like structure, which may be likened to an assembly of steam vessels, the electrolyte may decompose and/or the sinter-structure may crack because of the increased internal pressure. As a consequence, instabilities may be introduced into the system, which adversely affect the performance of the capacitor. Such instabilities are, of course, unacceptable. Therefore, thermal management of the anode system during anodization becomes critical in order to anodize large sintered anodes of volumes 1 cm$^3$ and above.

One way to thermally manage the system would be to simply cool the electrolyte bath. However, along with a decreasing temperature, the viscosity of the electrolyte will increase, which in turn decreases the ability of the electrolyte to wet the metal powder particles within the cave-like sinter-structure. Therefore, cooling alone will not work, at least for traditional electrolytes, which typically contain glycols and are fairly viscous. The '993 patent suggests periodically replacing heated electrolyte inside the anodized structure with fresh electrolyte from the anodization electrolyte bath by means of diffusion during periods of time when the applied formation potential is turned off. In other words, the formation potential is periodically dropped to zero for a time long enough to allow the electrolyte inside the pellet to cool and diffuse. Therefore, hot, condensed electrolyte, which, upon prolonged heating would likely be reduced to solid residuals, may be replaced by fresh electrolyte from the anodization bath during the time period in which the formation potential is turned off.

In addition, the current is reduced in a stepwise fashion in conjunction with raising the formation potential, according to the authors of patent '993. In one of the examples listed in patent '993, the current $I_1$ is initially set in a range of about 80 mA for an 8 gram anode. The current $I_1$ is maintained until a formation potential $V_1$=75 V is reached. Following this step, the formation potential is turned off for 3 hours to allow for cooling and electrolyte replenishment inside the anode pellet. The potential is then raised in steps, the size of which decreases with increasing potential while, at the same time, the current, that is allowed to flow through the system, is decreased. In the potential regime just below the target formation potential of 231 Volts, the current setting in the above referenced example is just 31 mA, or approximately ⅓ of the initial current setting. In another example, the rest intervals are on the order of one hour, and the formation potential steps are applied for one to three hours. This method clearly can become very time consuming, as can be readily estimated using Faraday's laws: consider, for example, a target formation potential of 225 V and a current setting of 50 mA; then, for an 8 g Ta anode consisting of a powder with a surface area of 0.1 m$^2$/g and pressed to a density of ~8 g/cm$^3$ or 50% of the density of bulk Ta metal, the net formation time is estimated to be 45 h. Considering that additional time is required due to hold times at the end of the formation, time required because of restricted electrolyte access to the anode's cave structure and the time periods during which the power supply is turned off, the formation method suggested in '993 may easily result in anodization times of one week or more. In addition, the application of the method suggested in '993 results in prolonged periods of anodization time during which low currents are used together with high potentials, specifically in the potential regime just below the target formation potential.

According to models from L. L. Odynets (*Soviet Electrochemistry* 23(12) pp 1591–1594 (1987)), these conditions are favorable for the occurrence of field crystallization: during field crystallization, crystalline tantalum pentoxide grows at the metal-oxide interface, i.e., beneath the amorphous oxide that grows preferably under high current formation conditions. In the long term, the growth of crystalline oxide seeds beneath the previously grown amorphous layer may lead to the destruction of the capacitor. In the short term, crystalline growth may result in unfavorably high leakage currents. Therefore, high potential, low current, formation conditions should be avoided or kept as short as possible.

The authors of the '993 patent do not mention another important component of the anodization process, namely the agitation of the electrolyte. Yet agitation is extremely important for maintaining an approximately isotropic temperature profile throughout the anode during anodization. Typically, stirring impellers, e.g. rotating magnets, are placed within the solution and rotated to agitate the electrolyte.

In U.S. Pat. No. 6,235,181, Kinard et al. emphasize the need for agitation of the electrolyte during the formation process and also suggest ultrasonic agitation of the electrolyte during the anodization process as an alternative to the use of stirring impellers. However, the use of ultrasonic agitation in the '181 patent is explicitly directed to the above mentioned process of non-thickness limited anodizing of sintered Ta anodes, where a very specific electrolyte (dibasic potassium phosphate dissociated in heat treated glycerol) is prescribed. This electrolyte is to be used at temperatures at or above 150 C, a temperature regime in which local temperature fluctuations are difficult to avoid. Ultrasonic agitation is expressly applied to avoid or "drastically reduce" temperature fluctuations within the bulk of the electrolyte at these comparatively high electrolyte temperatures.

In summary, the reported anodization processes for comparatively large, high voltage wet electrolytic valve metal anodes tend to take a considerable amount of valuable production time and they tend to produce low yields, either because deposits of electrolyte decomposition products may render the anode unusable or because field crystallization has caused unacceptably high leakage currents. Therefore, there is a need for new and improved methods of anodizing valve metals.

Accordingly, there is a need to define a formation process for high voltage, electrolytic valve metal anodes. The process must deliver a high yield of fully formed anodes, it must be more economical than the processes reported in the patent literature so far, i.e., it must be shorter, and it must allow for the use of comparatively high current settings throughout the entire formation cycle.

SUMMARY OF THE INVENTION

The present invention provides a method and process for anodizing a pressed and sintered valve metal anode to a target formation potential, comprising the steps of: immersing a pressed valve metal anode in an anodizing electrolyte to wet the anode and develop an anode-electrolyte system; and subjecting the anode-electrolyte system to a potential that is ramped up from a starting potential to a target potential in a pulsed fashion whereby both, formation current and formation potential are delivered to the anode in a pulsed fashion.

The applied pulses are preferably decreased in pulse width as the formation potential increases. The pulse width of the applied pulses is preferably defined as the duty cycle of the formation potential waveform. The duty cycle may decline from 100% in the low formation potential regime to as low as 1% in the vicinity of the target formation potential. After reaching the target formation potential, the potential pulses with a pulse height equal to the target formation potential are preferably applied for a hold time until the pulsed current declines toward zero current flow.

In one process, the electrolyte is agitated during the entire formation cycle, by stirring the electrolyte using an impeller, for example, a magnetically driven impeller. In addition, sound or ultra-sound energy is used to promote heat exchange and electrolyte diffusion between the anode's karst structure and the surrounding electrolyte bath. Preferably, the latter type of agitation is applied only during the fraction of the formation waveform period in which the voltage is zero.

The invention is specifically useful for forming high voltage, high capacitance anodes as it allows for managing the thermal energy dissipation during the formation process. As will be further detailed in the examples below, setting the parameters outlined above to appropriate values provides for a high yield of fully formed anodes with low leakage currents at the operating voltage.

BRIEF DESCRIPTION OF THE DRAWINGS

These and other advantages and features of the present invention will be appreciated as the same becomes better understood by reference to the following detailed description of the preferred embodiment of the invention when considered in connection with the accompanying drawings, in which like numbered reference numbers designate like parts throughout the figures thereof, and wherein:

FIG. 2*b* is an expanded detail view (1 hour) of the pulsed formation potential envelope shown in FIG. 2*a*. On this time scale, individual potential pulses are discernable.

DETAILED DESCRIPTION OF THE PREFERRED EMBODIMENTS

Figure 1A:
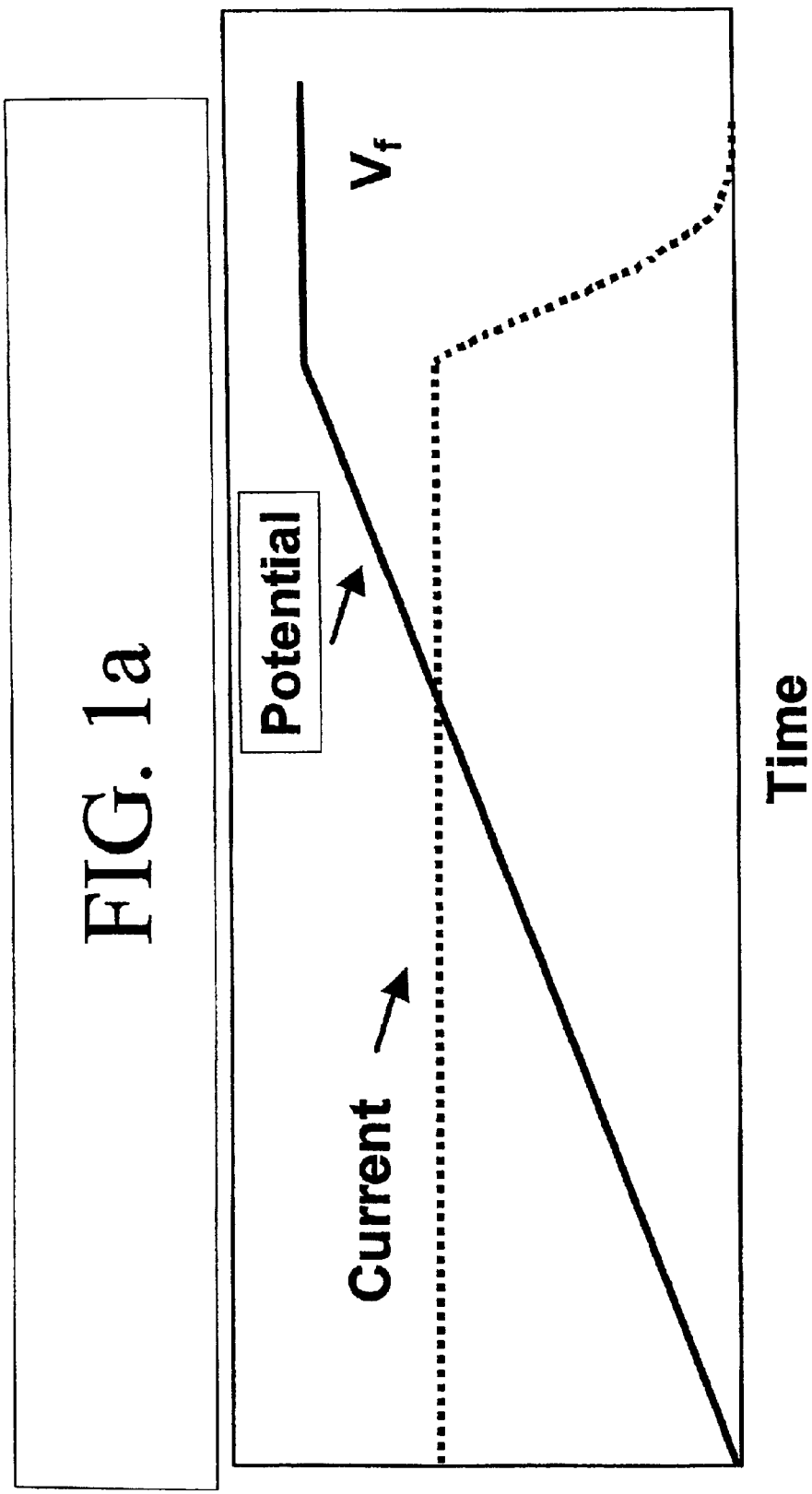
FIG. 1*a* is a graphical depiction of typical prior art formation traces: the potential rises smoothly until the target potential is reached. It then stays constant for a predetermined hold time during which the current falls towards zero.
Figure 1B:
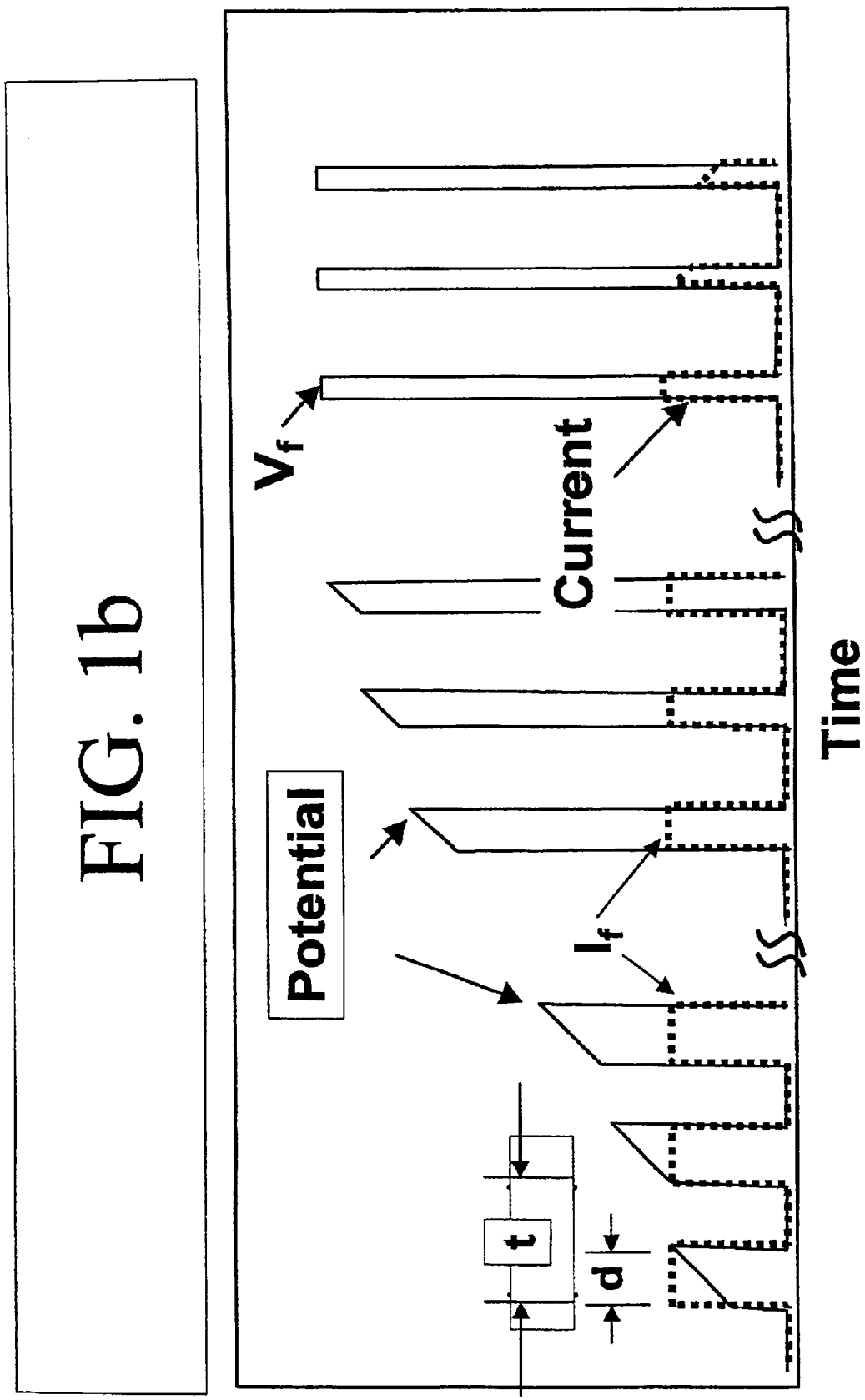
FIG. 1*b* is a graphical depiction of formation traces obtained using a pulsed formation potential in accordance with the present invention.

FIG. 1a represents typical formation traces obtained with traditional formation protocols. The current is set to a constant level, and the voltage rises slowly until the target formation potential $V_f$ is reached. The current falls rapidly once the formation potential is reached. Minor modifications to this protocol are described in the above-referenced '993 patent, where it is prescribed that the voltage is to be turned off approximately every three hours in order to allow for electrolyte cooling and diffusion FIG. 1b schematically represents current and potential traces resulting from the application of a pulsed formation potential. The formation waveform is defined by the waveform period t, which may be constant or variable throughout the formation and a duty cycle d, which also may be constant or variable throughout the formation. The ratio of the time width of the applied current or potential pulse to the time of the waveform period t, expressed in percent, is the duty cycle d. Preferably, the duty cycle d would be high during the initial phase of the formation, where the potential and current pulse widths would be long. The duty cycle d and correspondingly the applied potential and current pulse widths would decrease as the formation potential increases toward and reaches the target formation potential.

The formation method of the present invention illustrated in FIG. 1b accomplishes a comprehensive and accurate thermal management of the sintered valve metal anode as it is anodized, whereby anodization failures due to build-up of electrolyte residue and field crystallization are largely avoided. The forming process is simply defined by a limited set of parameters, that are readily adjusted to various anode sizes and to their internal properties. The required equipment is standard for the industry and includes a programmable constant current/constant voltage power supply, equipment for agitating or stirring the electrolyte both, mechanically and by means of sound or ultrasound, a stainless steel forming container, and standard data collection devices.

In accordance with the present invention, the formation protocol for high voltage anodes is characterized by the following parameters and is generally illustrated in FIG. 1b:

1.) A target formation potential $V_f$.
2.) A formation current $I_f$.
3.) A formation frequency $v_f=1/t$ defining the waveform period of the pulsed application of the formation potential.
4.) A duty cycle d of the rectangular formation potential waveform defining the fraction of the formation potential waveform period during which the potential is applied to the anode and during which the formation current $I_f$ is flowing through the anode-electrolyte system.
5.) A formation bath temperature $T_f$, typically set at 40° C. or lower for large high voltage electrodes.

The amplitude of the formation potential is ramped up from an initial potential $V_f$ to a target or final potential $V_f$.

The potential is applied in a pulsed fashion. The pulse frequency may be constant or variable during the process and the duty cycle d may change from 100% in the low potential regime at the beginning of the formation process to 1% in the high potential regime at the end of the formation process. The pulses continue to be applied across the anode-electrolyte system for a hold time following the achievement of the target formation potential $V_f$ until current flow at the target formation potential declines substantially towards zero.

In the examples illustrated in FIGS. 2a–2d and 3a–3c, the formation of the Ta anodes was carried out in a standard formation electrolyte. Recipes as to how to make such an electrolyte are known to those skilled in the art, e.g., the recipe disclosed in the above-referenced '181 patent. Examples of the protocols of the present invention employing a continuously stirred electrolyte maintained at 40° C. containing 55% of an ethylene glycol variety, 44% water and 1% phosphoric acid and having a conductivity of 2000 $\mu$S/cm at 40° C. are set forth as follows in reference to FIGS. 2a–2d and 3a–3c.

EXAMPLE 1

Figure 2A:
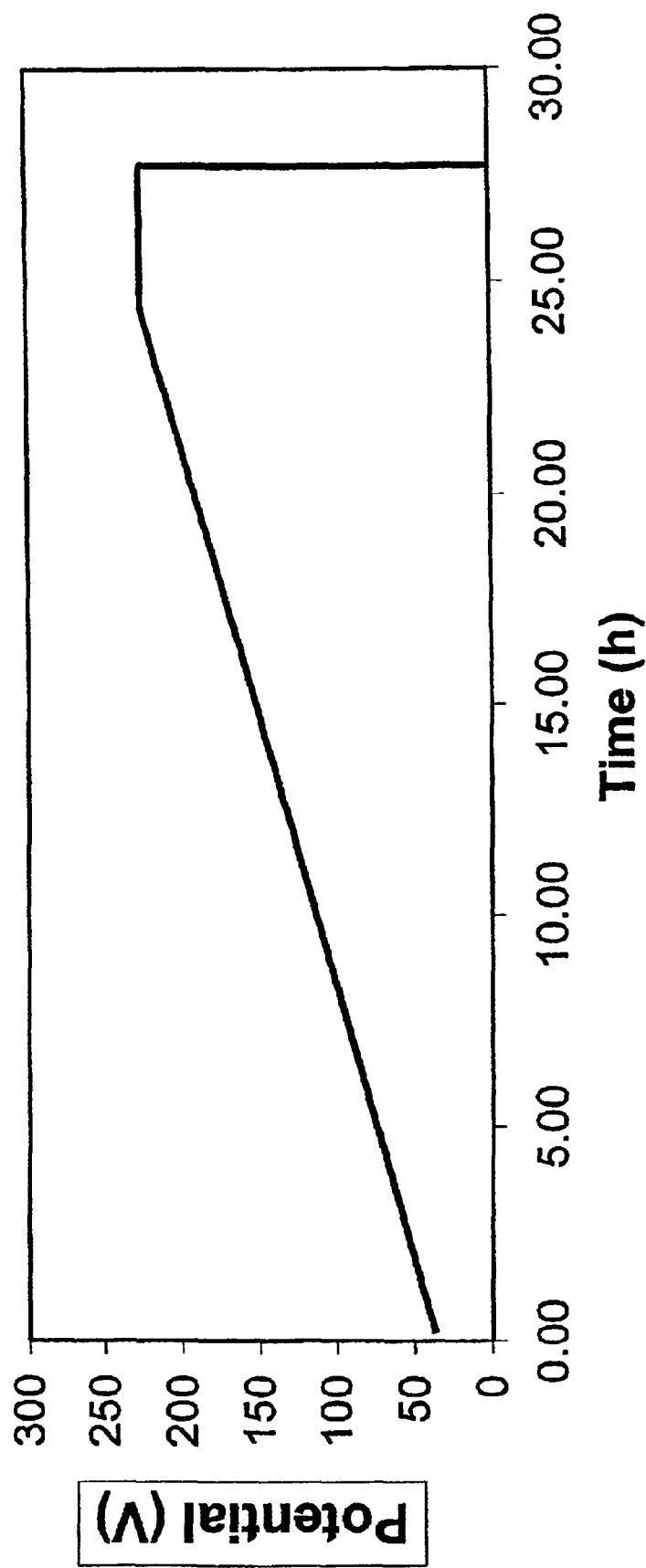
FIG. 2*a* is a graphical depiction of the envelope of the peaks of the formation potential pulses, having a constant duty cycle, to a Ta anode over a 26 hour formation period in accordance with a first example of the present invention.

FIG. 2a illustrates the measured formation peak potential trace as a function of time for the Ta anode of this example. In this example, the waveform period t was set to 180 seconds; the current was limited to 135 mA. The duty cycle of the applied current pulses was held constant at 50%, i.e., the potential and current pulse on-time was 90 seconds per waveform period t. The target formation potential $V_f$ of 225 Volts was reached after approximately 24 hours of pulsed potential application, and the potential remained constant at $V_f$=225 Volts for the next two hours.

FIG. 2b is detail from FIG. 2a (note the time scale) wherein individual potential pulses can be discerned.

Figure 2C:
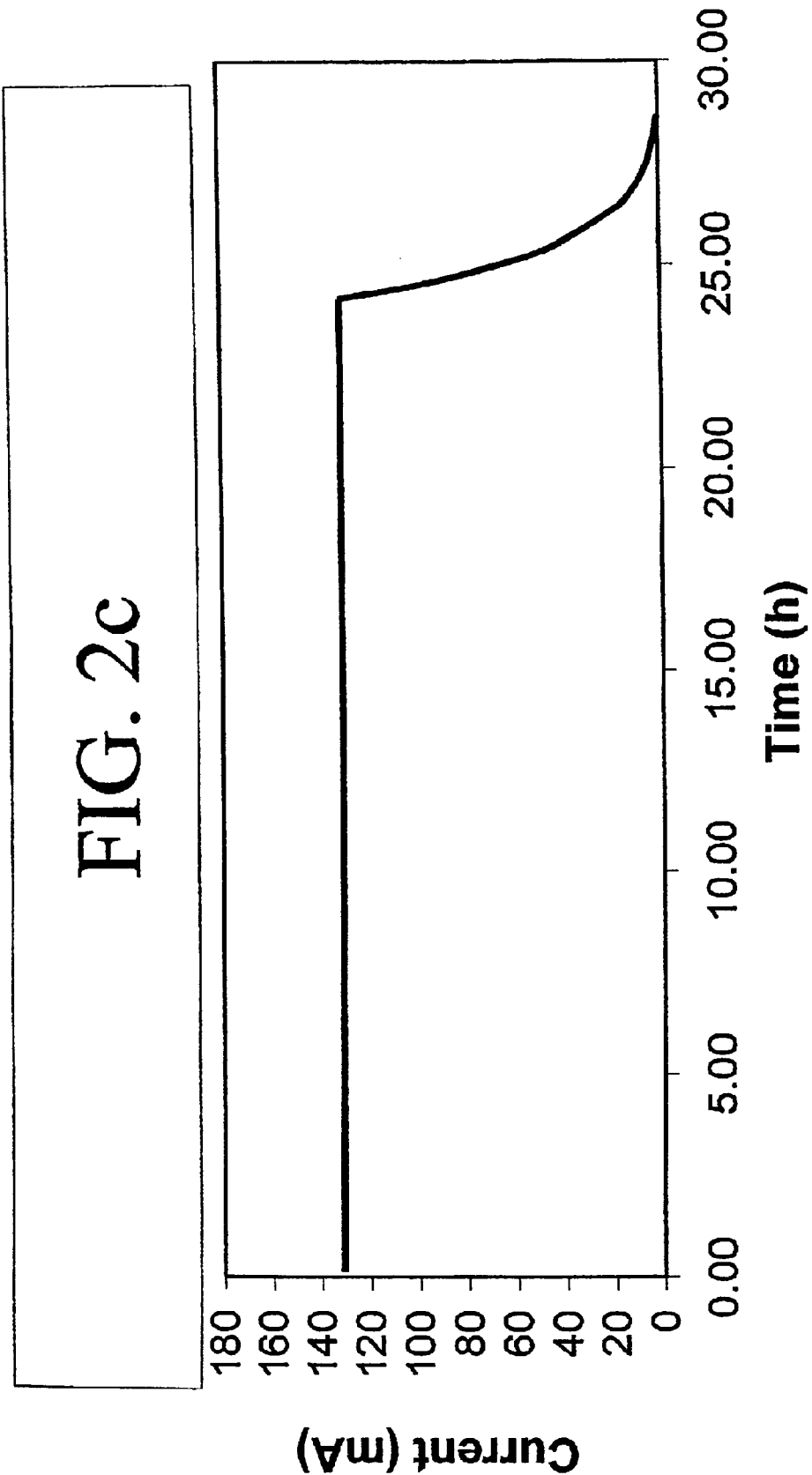
FIG. 2*c* is a graphical depiction of the envelope of the peaks of the applied current pulses, which correspond to the envelope of the peaks of the potential pulses shown in FIG. 2*a*.
Figure 2D:
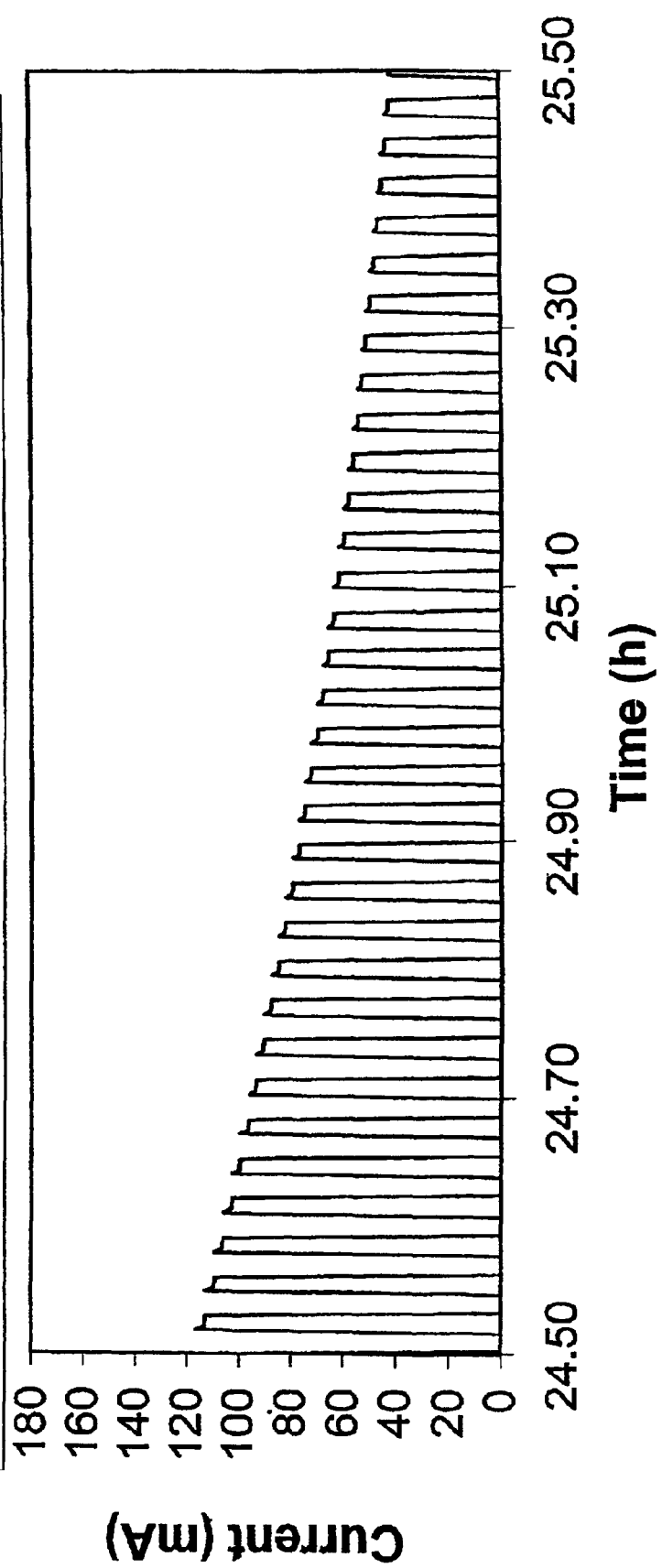
FIG. 2*d* is an expanded detail view of the formation current pulses (1 h) of the formation current envelope shown FIG. 2*c*. On this time scale, individual current pulses are discernable.

FIG. 2c represents the peak current trace of the current pulses applied over the 26 hour formation time of FIG. 2a. The current can have an initial high setting of 3 $\mu$A/$\mu$C or 30 $\mu$A/cm². FIG. 2d is an expanded detail of the end time period of FIG. 2c wherein individual current pulses can be discerned. Note the rapid decay of the current over this "hold time" once the target formation potential of 225V had been reached after about 24 hours.

The Ta anode was fully formed in about 26 hours in spite of the comparatively large volume of the anode (around 1 cm³), and an acceptable final leakage current below 200 $\mu$A at 40° C. was measured with this example. Achieving this target formation potential would have likely taken significantly longer time to complete using formation protocols published earlier by other authors. In addition, the risk of anode failure due to field crystallization would have likely been significantly increased.

EXAMPLE 2

The formation protocol used in Example 1 is improved by a programmed variation of the duty cycle, i.e. the time fraction of the waveform period during which potential pulse is applied. Specifically, the duty cycle is reduced to below 50% towards the end of the formation process. The reduction in duty cycle keeps the temperature of the sample almost constant. While the formation may take more time, the formation results become more predictable and the overall yield is likely improved.

Figure 3A:
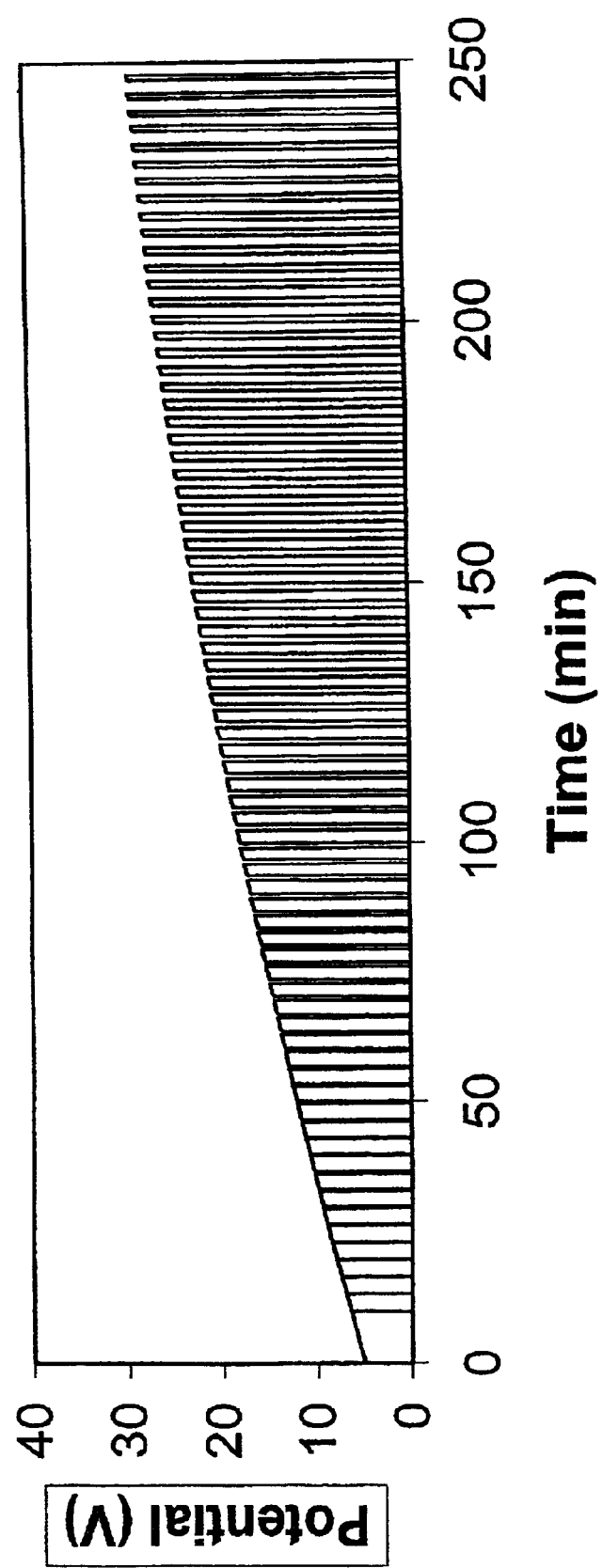
FIG. 3*a* is a graphical depiction of a formation trace resulting from potential pulses having a time varying duty cycle to a Ta anode in accordance with a second example of the present invention.
Figure 3B:
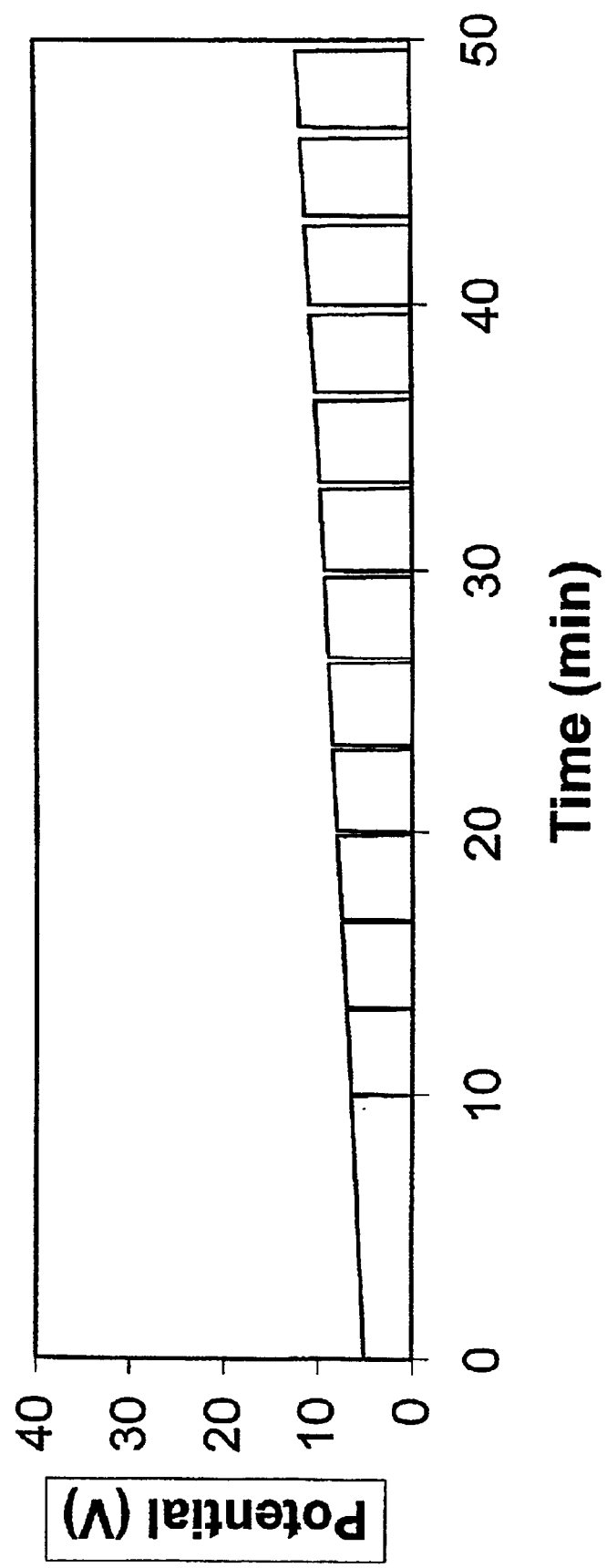
FIG. 3b is an expanded detail view of the pulsed formation potential depicted in FIG. 3a, highlighting the beginning of the formation and showing the decreasing duty cycle as the formation potential increases.
Figure 3C:
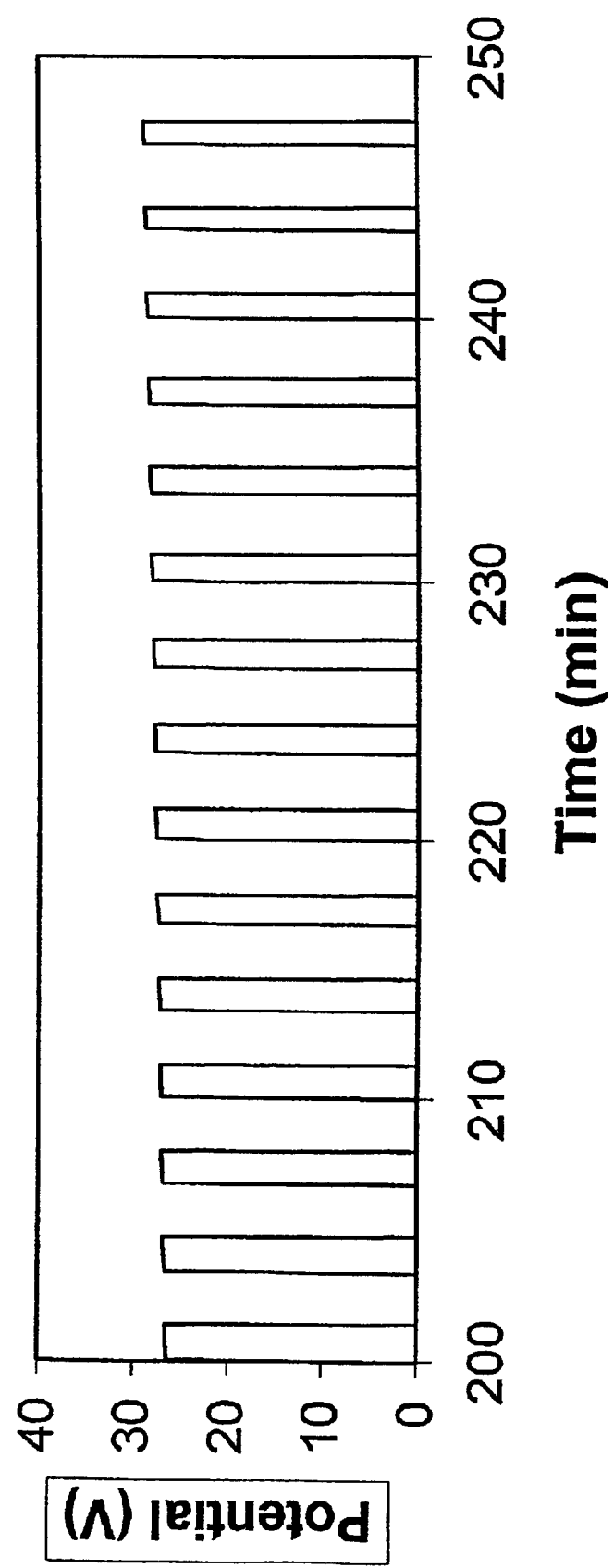
FIG. 3c is an expanded detail view of the pulsed formation potential depicted in FIG. 3a highlighting the end of the formation and showing the further decreasing duty cycle as the formation potential increases.

FIG. 3a shows a formation potential trace in which the duty cycle of the formation potential and current pulses was decreased from 100% at the beginning of the formation to 10% at the end. FIG. 3b shows an expanded detail of the beginning of the curve shown in FIG. 3a (note the time scale). FIG. 3c shows a detail of the end of the formation trace shown in FIG. 3a (note the time scale and the increased time between potential pulses).

EXAMPLE 3

The formation protocol used in the Examples 1 and 2 may be even further improved when the anode/electrolyte system is agitated periodically in the time periods between potential pulses, i.e., during the potential off-time periods. The agitation is preferably accomplished by activating sound or ultrasound generating devices located near or around the forming anode. The thermal management of the anode/electrolyte system is further improved, resulting in a very stable oxide exhibiting a low leakage current.

EXAMPLE 4

The formation protocol used in the Examples 1 and 2 may be somewhat modified by allowing the waveform period t and the current setting $I_f$ to change during the formation process. For example, it may be beneficial in some instances to lower the current setting from an initial high setting of 3 $\mu A/\mu C$ or 30 $\mu A/cm^2$ to 1 $\mu A/\mu C$ or even 0.1 $\mu A/\mu C$ at the end of the formation, when the formation potential is in the vicinity of the target formation potential. Likewise, it may be beneficial in some instances to increase the time period t of the formation potential waveform from an initial setting of t=60 seconds to t=300 seconds. The latter would be equivalent to decreasing the pulse frequency $v_f=1/t$ from 0.016 Hz to 0.0033 Hz.

All patents and printed publications disclosed herein are hereby incorporated by reference herein into the specification hereof, each in its respective entirety.

The preceding specific embodiments are illustrative of an anode formation process for anodes usable in capacitors, particularly capacitors incorporated into an IMD, in accordance with the present invention. It is to be understood, therefore, that other expedients known to those skilled in the art or disclosed herein, and existing prior to the filing date of this application or coming into existence at a later time may be employed without departing from the invention or the scope of the appended claims.

What is claimed is:

1. A method of anodizing a pressed and sintered valve metal anode to a target formation potential, comprising:
    a) immersing the pressed valve metal anode in an anodizing electrolyte to wet the anode and develop an anode-electrolyte system;
    b) subjecting the anode-electrolyte system to pulses of electrical potential that are ramped up from a starting voltage to a target voltage over a formation time; and
    c) agitating the electrolyte,
    wherein said a anodizing electrolyte is maintained at about 40 degrees Celsius or less during the anodizing process, and wherein the agitating step comprises subjecting the electrolyte to sound energy at a frequency in the range from ultrasonic frequencies to audible frequencies during selected time intervals of the waveform period.

2. A method of anodizing a pressed and sintered valve metal anode to a target formation potential, comprising:
    a) immersing the pressed valve metal anode in an anodizing electrolyte to wet the anode and develop an anode-electrolyte system;
    b) subjecting the anode-electrolyte system to pulses of electrical potential that are ramped up from a starting voltage to a target voltage over a formation time; and
    c) agitating the electrolyte,
    wherein said anodizing electrolyte is maintained at about 40 degrees Celsius or less during the anodizing process, and wherein the agitating step comprises subjecting the electrolyte to stirring induced by a mechanical impeller and to sound energy at a frequency in the range from ultrasonic frequencies to audible frequencies during selected time intervals of the waveform period.

3. A method of anodizing a pressed and sintered valve metal anode to a target formation potential, comprising;
    a) immersing the pressed valve metal anode in an anodizing electrolyte to wet the anode and develop an anode-electrolyte system; and
    b) subjecting the anode-electrolyte system to pulses of electrical potential that arm ramped up from a starting voltage to a target voltage over a formation time,
    wherein said anodizing electrolyte is maintained at about 40 degrees Celsius or less during the anodizing process, and further comprising the step of agitating the electrolyte only during time periods between pulses of electrical potential.

4. A method according to claim 3, wherein the agitating step comprises stirring the electrolyte.

5. A method according to claim 3, wherein the agitating step comprises subjecting the electrolyte to sound energy at a frequency in the range from ultrasonic frequencies to audible frequencies during selected time intervals of the waveform period.

6. A method according to claim 3, wherein the agitating step comprises subjecting the electrolyte to stirring induced by a mechanical impeller and to sound energy at a frequency in the range from ultrasonic frequencies to audible frequencies during selected time intervals of the waveform period.

7. A method of anodizing a pressed end sintered valve metal anode to a target formation potential, comprising:
    a) immersing the pressed valve metal anode in an anodizing electrolyte to wet the anode and develop an anode-electrolyte system; and
    b) subjecting the anode-electrolyte system to pulses of electrical potential that are ramped up from a starting voltage to a target voltage over a formation time;
    wherein said anodizing electrolyte is maintained at about 40 degrees Celsius or less during the anodizing process, and wherein the subjecting step further comprises: delivering the pulses of electrical potential having a pulse amplitude, and pulse width and a duty cycle to the anode-electrolyte system; and modifying the duty cycle of the potential pulses as the pulse amplitude approaches the target voltage.

8. A method according to claim 7, wherein the modifying step further comprises decreasing the duty cycle as the pulse amplitude approaches the target voltage.

9. A method of anodizing a pressed and sintered valve metal anode to target formation potential, comprising:
    a) immersing the pressed valve metal anode in an anodizing electrolyte to wet the anode and develop an anode-electrolyte system; and
    b) subjecting the anode-electrolyte system to pulses of electrical potential that are ramped up from a starting voltage to a target voltage over a formation time;
    wherein said anodizing electrolyte is maintained at about 40 degrees Celsius or less during the anodizing process, and wherein the subjecting step further comprises; delivering the pulses of electrical potential having a pulse amplitude, and a frequency to the anode-electrolyte system; and modifying the pulse width and the pulse frequency as the pulse amplitude approaches the target voltage.

10. A method according to claim 9, wherein the subjecting step further comprises delivering the pulses of electrical potential to the anode-electrolyte system for a predetermined hold time after achievement of the target voltage until the current flow through the anode-electrolyte system has dropped to a predetermined level.

11. A method according to claim 9, further comprising step of agitating the electrolyte in the time between delivered pulses of electrical potential.

12. A method according to claim 11, wherein the agitating step further comprises subjecting the electrolyte to sound energy at a frequency in the range from ultrasonic frequencies to audible frequencies.

13. A method of anodizing a pressed and sintered valve metal anode to a target formation potential, comprising:
   a) immersing the pressed valve metal anode in an anodizing electrolyte to wet the anode and develop an anode-electrolyte system; and
   b) subjecting the anode-electrolyte system to pulses of electrical potential that are ramped up from a starting voltage to a target voltage over a formation time;
   wherein said anodizing electrolyte is maintained at about 40 degrees Celsius or less during the anodizing process, and wherein the subjecting step further comprises:
   delivering the potential pulses having a pulse amplitude, and pulse width, and a frequency to the anode-electrolyte system; and
   decreasing the pulse width and decreasing the frequency of the pulses of electrical potential as the pulse amplitude approaches the target voltage.

14. A method according to claim 13, wherein the subjecting step further comprises delivering the pulses of electrical potential to the anode-electrolyte system for a predetermined hold time after achievement at the target voltage until the current flow through the anode-electrolyte system has dropped to a predetermined level.

15. A method according to claim 13, further comprising the step of agitating the electrolyte in the time between delivered pulses of electrical potential.

16. A method according to claim 15, wherein the agitating step further comprises subjecting the electrolyte to sound energy at a frequency in the range from ultrasonic frequencies to audible frequencies.

17. A method of anodizing a pressed and sintered valve metal anode to a target formation potential, comprising;
   a) immersing the pressed valve metal anode in an anodizing electrolyte to wet the anode and develop an anode-electrolyte system; and
   b) subjecting the anode-electrolyte system to pulses of electrical potential that are ramped up from a starting voltage to a target voltage over a formation time; less during the anodizing process, and wherein the subjecting step further comprises:
   delivering the pulses of electrical potential having pulse amplitudes and pulse widths to the anode-electrolyte system; and
   decreasing the pulse width of the potential pulses as the pulse amplitude approaches the target voltage.

18. A method according to claim 17, wherein the subjecting step further comprises delivering the pulses of electrical potential to the anode-electrolyte system for a predetermined hold time after achievement of the target voltage until the current flow through the anode-electrolyte system has dropped to a predetermined level.

19. A method according to claim 17, further comprising the step of agitating the electrolyte in the time between delivered pulses of electrical potential.

20. A method according to claim 19, wherein the agitating step further comprises subjecting the electrolyte to sound energy at a frequency in the range from ultrasonic frequencies to audible frequencies.

21. A method of anodizing a pressed and sintered valve metal anode to a target formation potential, comprising:
   a) immersing the pressed valve metal anode in an anodizing electrolyte to wet the anode and develop an anode-electrolyte system; and
   b) subjecting the anode-electrolyte system to pulses of electrical potential that are ramped up from a starting voltage to a target voltage over a formation time;
   wherein said anodizing electrolyte is maintained at about 40 degrees Celsius or less during the anodizing process, and wherein the subjecting step further comprises delivering the pulses of electrical potential to the anode-electrolyte system for a predetermined hold time after achievement of the target voltage until the current flow through the anode-electrolyte system has dropped to a predetermined level, and further comprising the step of agitating the electrolyte in the time between delivered pulses of electrical potential.

22. A method according to claim 21, wherein the agitating step comprises subjecting the electrolyte to sound energy at a frequency in the range from ultrasonic frequencies to audible frequencies.

23. A method of anodizing a pressed and sintered valve metal anode to a target formation potential, comprising;
   a) immersing the pressed valve metal anode in an anodizing electrolyte to wet the anode and develop an anode-electrolyte system; and
   b) subjecting the anode-electrolyte system to potential pulses of electrical potential that are ramped up from a starting voltage to a target voltage over a formation time;
   wherein said anodizing electrolyte is maintained at about 40 degrees Celsius or less during the anodizing process, and wherein the subjecting step further comprises:
   delivering the pulses of electrical potential and current pulses having pulse amplitudes and pulse widths to the anode-electrolyte system; and decreasing the peak height of the current pulses as the amplitude of the pulses of electrical potential approach the target voltage.

* * * * *

UNITED STATES PATENT AND TRADEMARK OFFICE
CERTIFICATE OF CORRECTION

PATENT NO. : 6,802,951 B2
APPLICATION NO. : 10/058437
DATED : October 12, 2004
INVENTOR(S) : Joachim Hossick-Schott It is certified that error appears in the above-identified patent and that said Letters Patent is hereby corrected as shown below:

Column 9, line 55, delete "said a anodizing" and insert --said anodizing--

Column 10, line 18, delete "that arm" and insert --that are--

Column 10, line 38, delete "pressed end" and insert --pressed and--

Column 11, line 13, delete "comprising step" and insert --comprising the step--

Column 11, line 41, delete "at the target" and insert --of the target--

Column 11, line 58, delete "time; less" and insert --time; wherein said anodizing electrolyte is maintained at about 40 degrees Celsius or less--

Signed and Sealed this

Second Day of January, 2007

JON W. DUDAS
*Director of the United States Patent and Trademark Office*